(12) United States Patent
Singh et al.

(10) Patent No.: US 10,132,408 B2
(45) Date of Patent: Nov. 20, 2018

(54) PARK ACTUATOR ASSEMBLY FOR AN AUTOMATIC TRANSMISSION AND A TRANSMISSION INCLUDING A PARK ACTUATOR ASSEMBLY

(71) Applicant: GM GLOBAL TECHNOLOGY OPERATIONS LLC, Detroit, MI (US)

(72) Inventors: Gurdeep Singh, Canton, MI (US); Howard R Hespen, Clarkston, MI (US); Sarabjit Sidhu, Canton, MI (US); Carlos E Marin, Oxford, MI (US); Clay R Colley, Perrinton, MI (US)

( * ) Notice: Subject to any disclaimer, the term of this patent is extended or adjusted under 35 U.S.C. 154(b) by 177 days.

(21) Appl. No.: 15/238,792

(22) Filed: Aug. 17, 2016

(65) Prior Publication Data

US 2018/0051804 A1 Feb. 22, 2018

(51) Int. Cl.
*F16H 63/34* (2006.01)
*B60T 1/00* (2006.01)
*B60T 1/06* (2006.01)
*F16D 63/00* (2006.01)

(52) U.S. Cl.
CPC .......... *F16H 63/3425* (2013.01); *B60T 1/005* (2013.01); *B60T 1/062* (2013.01); *F16D 63/006* (2013.01)

(58) Field of Classification Search
CPC ... F16H 63/3425; F16H 63/3416; B60T 1/005
See application file for complete search history.

(56) References Cited

U.S. PATENT DOCUMENTS

| 4,518,066 A * | 5/1985 | Barr ....................... B60T 1/005 188/31 |
| 6,290,047 B1 * | 9/2001 | Adamczyk ............. B60T 1/005 188/31 |
| 6,419,068 B1 * | 7/2002 | Stephan .................. B60T 1/005 192/219.5 |
| 9,255,640 B1 * | 2/2016 | Sten .................... F16H 63/3458 |
| 2004/0245079 A1 * | 12/2004 | Kent ...................... H01H 13/18 200/276.1 |
| 2005/0205384 A1 * | 9/2005 | Reed ..................... F16H 57/031 192/219.5 |
| 2008/0127772 A1 * | 6/2008 | Sauter .................... B60T 1/005 74/575 |

FOREIGN PATENT DOCUMENTS

DE        3537091 A  * 10/1985  ............. B60T 1/005

* cited by examiner

*Primary Examiner* — Stacey A Fluhart

(57) ABSTRACT

A parking actuator assembly for an automatic transmission includes an actuator rod, an actuator axially slidable on the actuator rod, and a spring enclosed within the actuator on the actuator rod.

16 Claims, 10 Drawing Sheets

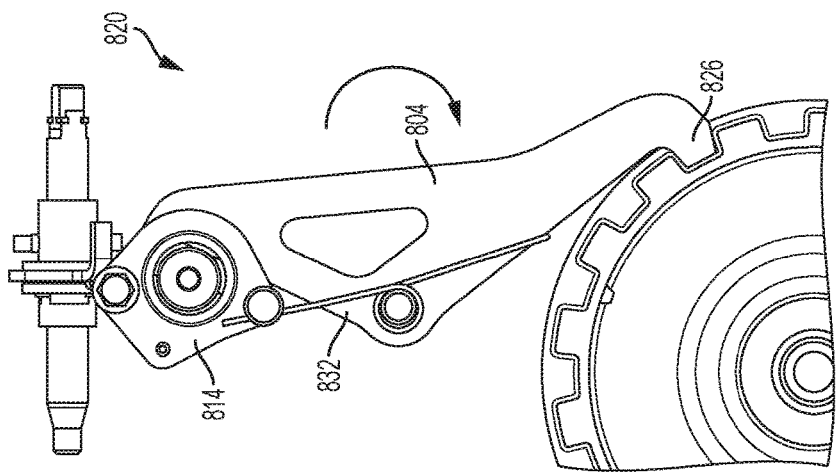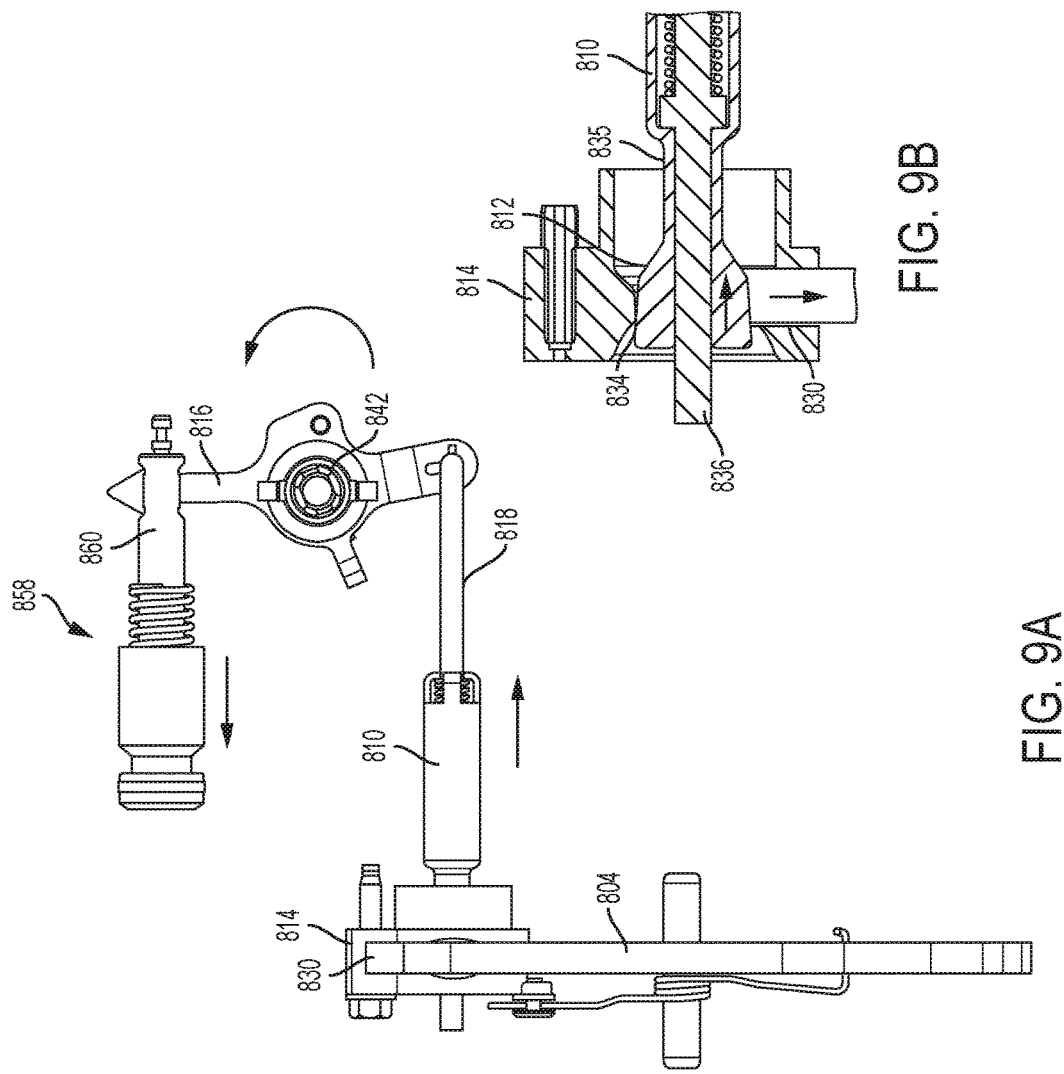

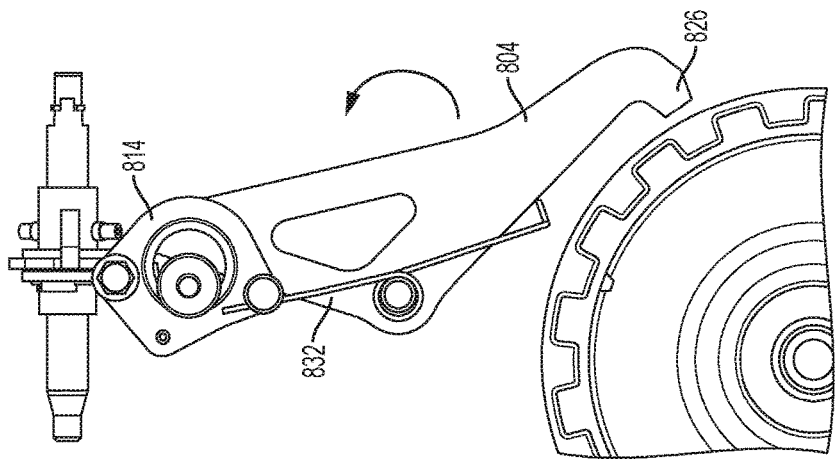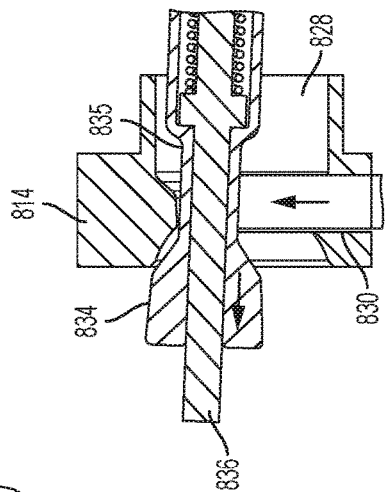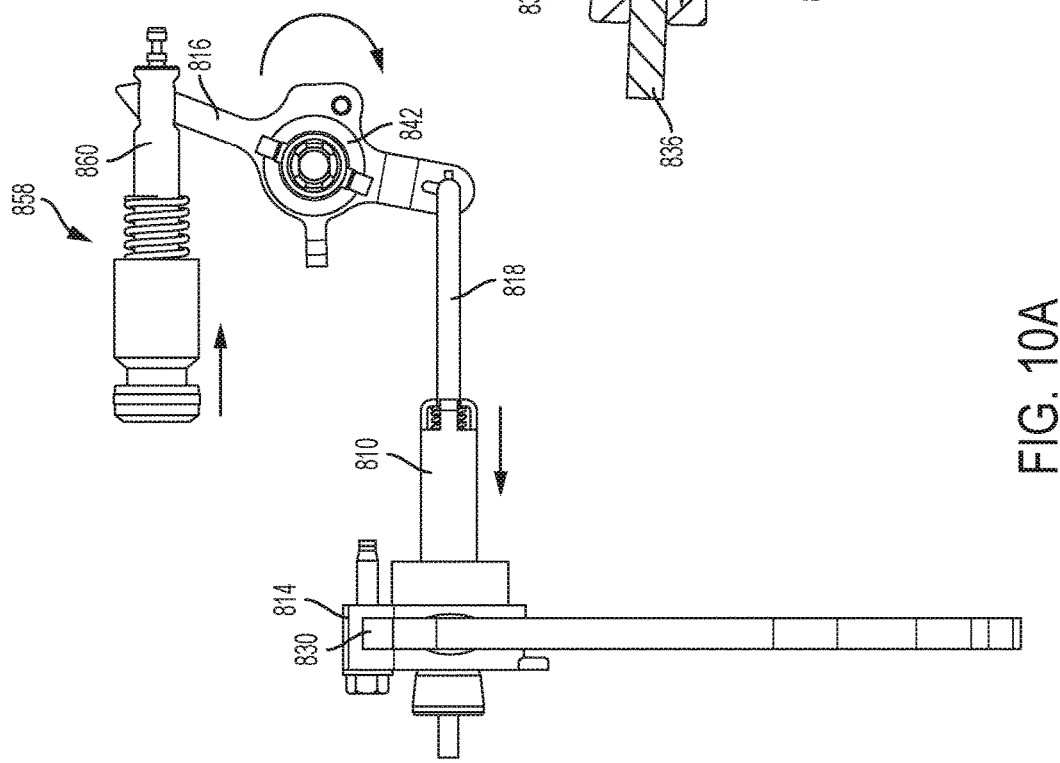

PARK ACTUATOR ASSEMBLY FOR AN AUTOMATIC TRANSMISSION AND A TRANSMISSION INCLUDING A PARK ACTUATOR ASSEMBLY

FIELD

The present disclosure relates to a park actuator assembly for an automatic transmission.

INTRODUCTION

This introduction is for the purpose of generally presenting the context of the disclosure. Work of the presently named inventors, to the extent it is described in this introduction section, as well as aspects of the description that may not otherwise qualify as prior art at the time of filing, are neither expressly nor impliedly admitted as prior art against the present disclosure.

Vehicle transmissions, specifically planetary gear automatic power transmissions, typically have a park brake mechanism to resist the vehicle's natural tendency to roll down a sloped surface when the vehicle is in park. The contents of such a park brake generally include some sort of gear that is fixed with respect to the output shaft of the transmission and a pawl designed to selectively engage with the gear when the park brake is activated. The pawl substantially prevents the output shaft and attached gear from rotating when the pawl engages with the recesses between the gear teeth.

FIG. 1 illustrates a park system 100 for a transmission (not shown). The system 100 includes a park gear 102 that is fixed with respect to an output shaft (not shown) of the transmission and a park pawl 104 rotatably mounted on pawl pin 106. A pawl return spring 108 is also mounted on the pawl pin 106 and rotatably biases a pawl tooth 126 on the park pawl 104 away from engaging the park gear 102. A park pawl system 120 is actuable with an actuator 110 with a cam portion 112 (FIG. 2), park pawl 104 in mechanical communication with the cam portion 112 and rotatable when in mechanical communication with the cam portion 112 to actuate the park pawl system 120. The actuator guide 114 accommodates the mechanical communication of the park pawl 104 and cam portion 112 when the park pawl system 120 is actuated. Also included is a shift selector 116, which actuates the park pawl system 120, and a connecting rod 118 that sends a mechanical signal from the shift selector 116 to the park pawl system 120. The actuator guide 114 is open ended to allow the connecting rod 118 to pass through the actuator guide 114.

FIG. 1 illustrates the interaction between the park gear 102, park pawl system 120 and the shift selector 116. The park gear 102 has a number of teeth 122 and tooth recesses 124 on its perimeter. The pawl 104 includes a pawl tooth 126 that fits into the tooth recesses 124 on the park gear 102 perimeter upon activation of the park pawl system 120 (as shown in FIGS. 4A-4C). The park pawl 104 is mounted on the pawl pin 106 and is free to rotate or pivot about the pawl pin 106. A pawl return spring 108 operates to bias the pawl 104 toward the disengaged position except when mechanically engaged. The pawl 104 is mounted adjacent to the slotted actuator guide 114 and actuator 110 so that upon transverse motion of the actuator 110 the pawl 104 is rotated or pivoted between the engaged and disengaged positions.

The actuator guide 114 encases the actuator 110. The actuator guide 114 has an internal cavity 128 (as shown in FIG. 4B) contoured to the shape of the actuator 110. The actuator guide 114 has a slot 130 on its perimeter, adjacent the back 132 of the pawl 104, which is configured to guide and support the pivotal movement of the pawl 104. Movement of the actuator 110 into of the actuator guide 114 (the actuator 110 is "pushed" into the actuator guide 114) causes the cam portion 112 and park land 134 of the actuator 110 to contact the back 132 of the pawl 104 which forces the park pawl 104 to rotate the pawl tooth 126 into engagement with a tooth recess 124 (as shown in FIG. 4C). Referring now to FIGS. 5A-5C, movement of the actuator 110 away with respect to the pawl 104 (the actuator 110 is "pulled" from the actuator guide) moves the cam portion 112 away from the back 132 of the pawl 104 to remove the force of the cam, which releases the pawl tooth 126 from a tooth recess 124. When the pawl tooth 126 is released from the tooth recess 124, the pawl return spring 108 rotates the pawl 104 into the disengaged position allowing the park gear 102 to freely rotate (as shown in FIG. 5C).

As is illustrated in FIGS. 2 and 3, the actuator 110 is spring mounted to an end portion 136 of the connecting rod 118. The actuator return spring 138 functions to enable shift selection of park regardless of the position of the pawl 104 relative to the park gear 102, teeth 122, and tooth recesses 124. If a park gear tooth 122 is located over or adjacent to the pawl tooth 126 when park is selected, the pawl tooth 126 will not engage in a tooth recess 124, but the end 136 of the connecting rod 118 will continue to move with respect to the actuator 110 against the bias of the actuator return spring 138, and the end 136 of the connecting rod 118 will extend slightly beyond the end of the actuator 110 and open-ended actuator guide 114. The actuator return spring 138 enables selection of park by maintaining an axial force or bias on the actuator 110 until the park gear 102 rotates to a point where the gear tooth 122 is no longer adjacent to the pawl tooth 126. With the continued bias of actuator return spring 138, the pawl tooth 126 will then engage with a tooth recess 124 at the first opportunity. The end 136 of the connecting rod 118, includes an expanded (or "mushroomed") end which functions as a mechanical link between the shift selector 116 and the actuator 110, is then stationary as the actuator 110 moves under the bias of the actuator return spring 138 and the pawl tooth 126 engages a tooth recess 124. The openness of the actuator guide 114 slightly extends the operating zone of the actuator 110 so that the connecting rod 118 of the actuator 110 may pass through until the pawl tooth 126 is able to engage with a tooth recess 124.

The connecting rod 118 is secured to the detent lever 140 of the shift selector 116. The detent lever 140 is pivotally secured to the transmission (not shown) at 142, where the selector shaft lever (not shown) is also connected. The perimeter of the detent lever 142 has detents 144 that are configured to engage with the cylindrical end 146 of a detent retention spring 148. The detent retention spring 148 is indirectly mounted with respect to the transmission so that upon placing the vehicle in park the selector shaft lever rotates the detent lever 140 and the cylindrical end 146 of the detent retention spring 148 engages with a detent 144 of the detent lever 140 to secure it in place.

Movement of the actuator off the end of the actuator rod 118 is resisted by the end 136 of the actuator rod having an expanded (mushroom shape). Pulling from the hooked end 150 of the actuator rod 118 (opposite from the expanded end 136) thus positively moves the actuator 110 to dis-engage from the park position. One problem is that the area of the surface of the actuator 110 contacting this expanded (mushroom shape) is small and may suffer from disengagement. These contacting surfaces may lead to a failure to maintain the actuator 110 on the actuator rod 118 as the actuator 110, under extreme/unusual forces, may deform and move off the end 136 of the actuator rod 118. In this situation, it may not be possible to disengage the park pawl 104 from the park gear 102. Alternatively extreme forces/situations may cause the actuator 110 to move off the end of the actuator rod 118 and undesirably cause the park pawl 104 to engage the parking gear 102.

SUMMARY

A parking actuator assembly for an automatic transmission includes an actuator rod, an actuator axially slidable on the actuator rod, and a spring enclosed within the actuator on the actuator rod. In this manner, functionality is improved, packaging spaced is reduced, which provides additional options such as an ETRS system, fewer manufacturing steps are required, the overall length of the actuator assembly is reduced, reliability of operation is improved and many additional advantages are obtained.

In another aspect, the actuator rod comprises an integral collar positioned within an internal cavity of the actuator.

In another aspect, the spring is within an internal cavity of the actuator.

In another aspect, the actuator includes tabs at one end of the actuator biasing against one end of the spring.

In another aspect, the tabs are separated by gaps.

In another aspect, a transmission park system includes a park gear, a park pawl pivotally mounted for selective engagement with the park gear, an actuator guide with a slot that receives a surface of the park pawl, and an actuator assembly. The actuator assembly including an actuator rod, an actuator axially slidable within the actuator guide on the actuator rod and in contact with the surface of the park pawl, a spring enclosed within the actuator on the actuator rod, and a shift selector connected to the actuator rod.

In another aspect, the actuator assembly is configured such that pulling on the actuator rod by the shift selector causes the actuator to axially slide on the actuator rod and contact between the actuator and the surface of the park pawl causes the park pawl to engage the park gear.

In another aspect, the actuator rod includes an integral collar positioned within an internal cavity of the actuator.

In another aspect, the spring is within an internal cavity of the actuator.

In another aspect, the actuator includes tabs at one end of the actuator biasing against one end of the spring.

In another aspect, the actuator includes a park land, a cam surface, and a non-park land, and contact with the surface of the park pawl on the actuator moves from the non-park land, across the cam surface and onto the park land when the shift selector pulls on the actuator rod.

In another aspect, the actuator encloses the spring within an internal cavity and includes tabs at one end of the actuator biasing against one end of the spring.

In another aspect, the actuator rod includes a collar positioned within the internal cavity and biasing against the other end of the spring.

In another aspect, the spring is compressed between the collar and the tabs when the shift selector pulls on the actuator rod as the surface of the park pawl axially slides between the non-park land, across the cam surface, and onto the park land.

In another aspect, the actuator assembly is configured such that pushing on the actuator rod by the shift selector causes the actuator to axially slide on the actuator rod and contact between the actuator and the surface of the park pawl causes the park pawl to dis-engage from the park gear.

In another aspect, the actuator rod comprises a collar enclosed within an internal cavity of the actuator.

In another aspect, the actuator includes an internal land that axially abuts the collar when the shift selector pushes on the actuator rod to move the actuator within the actuator guide such that contact with the surface of the park pawl moves from the park land, across the cam surface and onto the non-park land.

Further areas of applicability of the present disclosure will become apparent from the detailed description provided hereinafter. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIGS. 9A-9C illustrate the park system of FIG. 8 in a park mode;

FIGS. 10A-10C illustrate the park system of FIG. 8 in an out-of-park mode;

DETAILED DESCRIPTION

The enclosed description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

Figure 1:
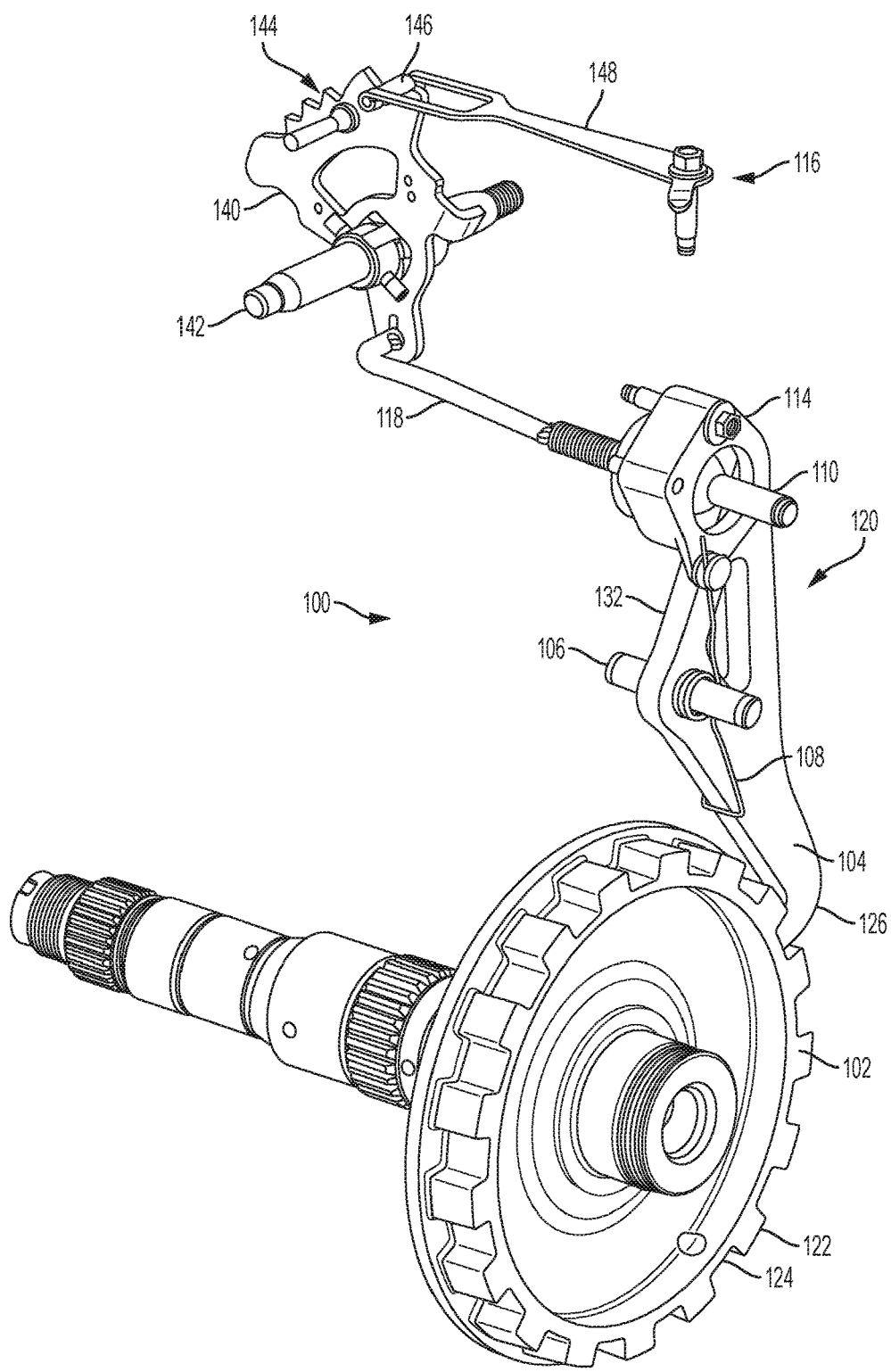
FIG. 1 is a perspective view of components of a park system for a transmission.
Figure 3:
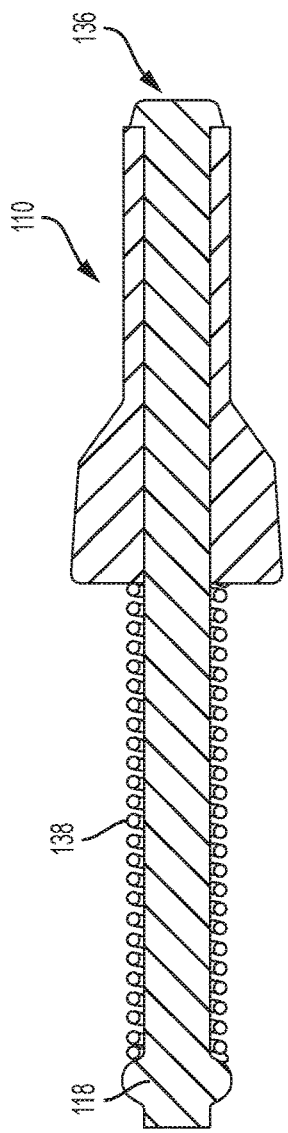
FIG. 3 is a partial cross-section of the park actuator of FIG. 2.
Figure 2:
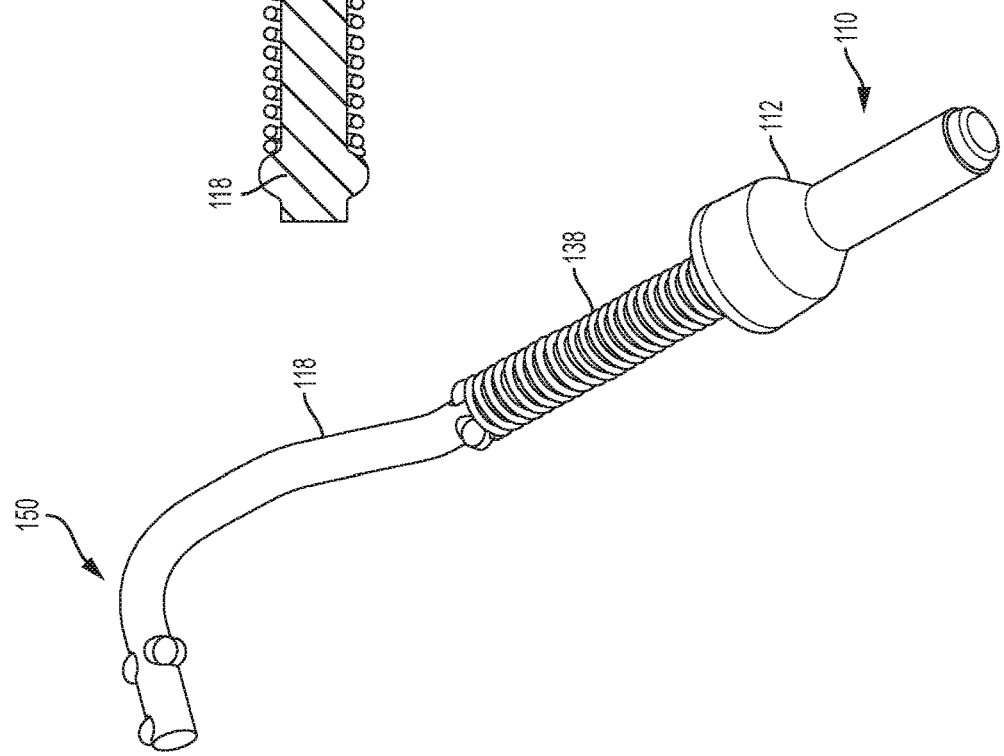
FIG. 2 is a perspective view of a park actuator of the park system of FIG. 1.
Figure 4C:
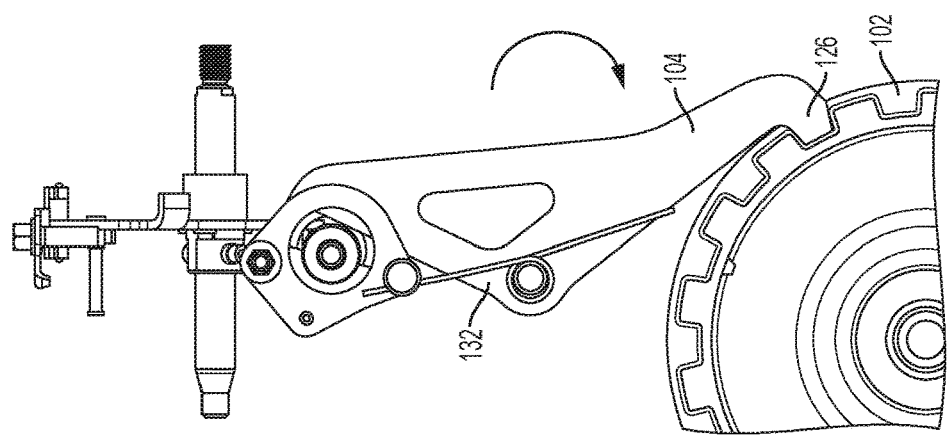
FIGS. 4A-4C illustrate the park system of FIG. 1 in a park mode.
Figure 4B:
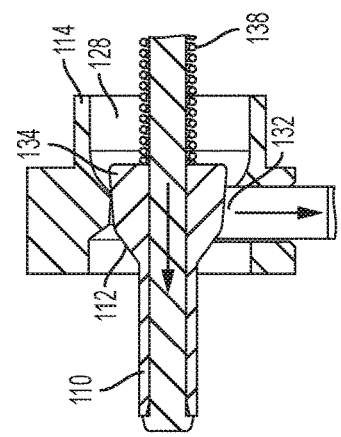
Figure 4A:
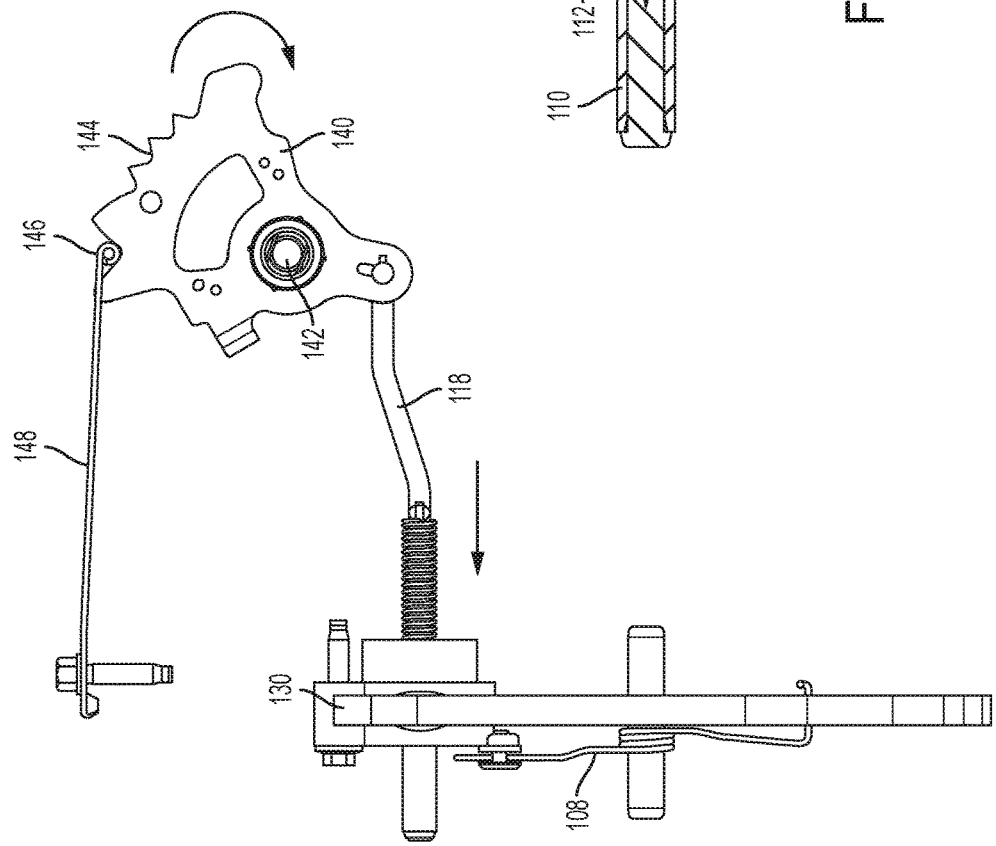
Figure 5C:
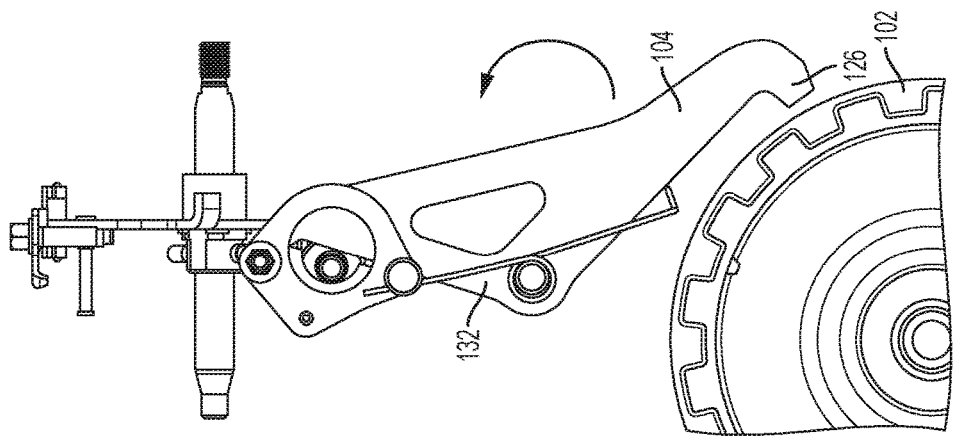
FIGS. 5A-5C illustrate the park system of FIG. 1 in an out-of-park mode.
Figure 5B:
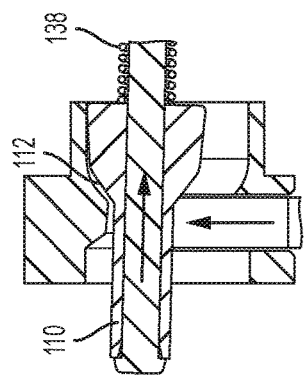
Figure 5A:
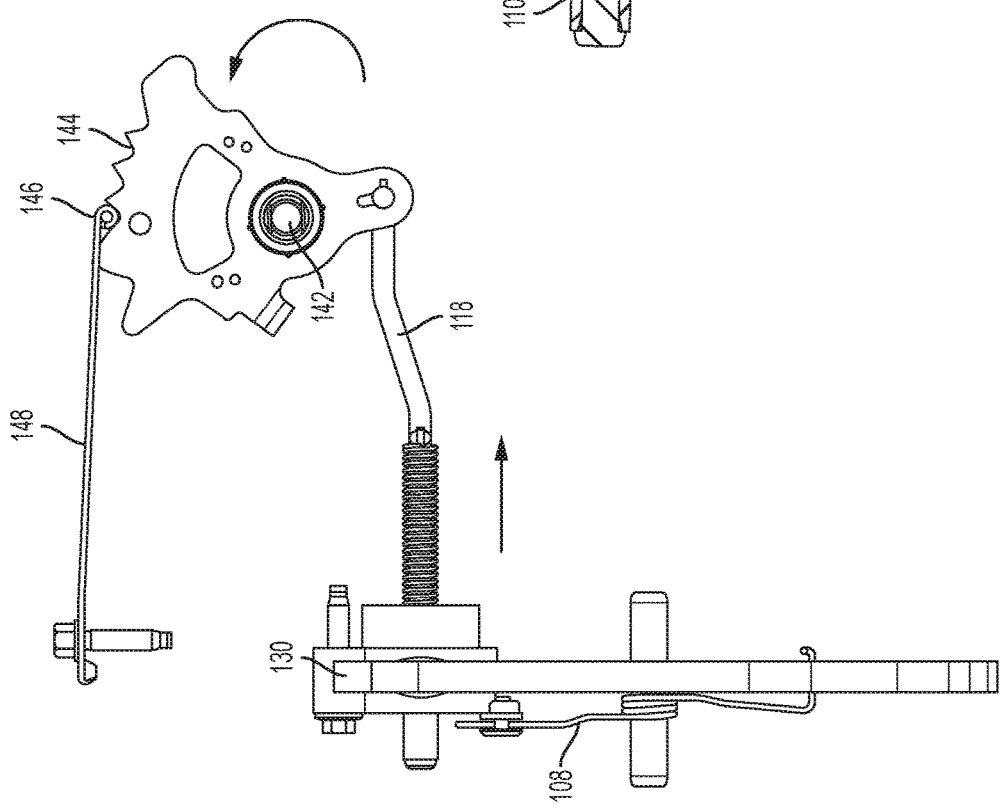

As illustrated in FIG. 1, traditionally, a driver interface is provided which the vehicle operator shifts to select the desired transmission range. The driver interface is linked to the automatic transmission by a range shift mechanism, only a portion of which (the shift selector 116, is illustrated), which typically includes a series of interconnected mechanical devices such as levers, push/pull rods, cables and the like. The number and size of such mechanical components make it difficult to package the range shift mechanism between the driver interface device and the transmission and can add significant frictional resistance to the overall system. As a result, the overall cost for design, manufacture and assembly of the vehicle is increased.

In an attempt to address such issues related to mechanically-shifted transmission range shift mechanisms, several "shift-by-wire" range shift mechanisms have been developed. Some shift-by-wire range shift mechanisms are based on an external system having an electric motor for controlling movement of the transmission's manual shaft to the desired range select position. Switches associated with the driver interface device send a mode signal to a transmission controller that is indicative of the selected transmission range. Thereafter, the controller actuates the electric motor to move the transmission manual shaft to the corresponding range select position. Drawbacks of such a system include the size and weight of the external motor, the associated packaging issues related to the motor, the cost of the motor and the controller and the undesirable failure modes associated with such a device.

Figure 6:
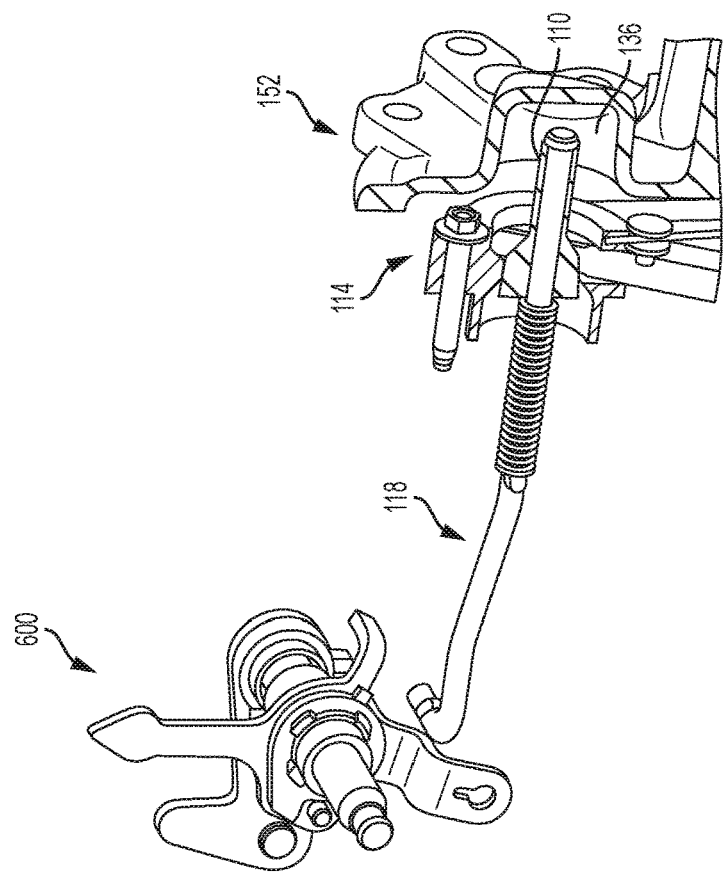
FIG. 6 is a perspective view of the park actuator of FIG. 2 in combination with an ETRS transmission.

One particularly advantageous system provides a solenoid assembly for implementation with an ETRS system that shifts a transmission range between a park position and an out-of-park position. One potentially limiting characteristic of an ETRS system as illustrated by, for example, FIG. 6, is that the ETRS park lever 600 may require a reversal of the actuation mode for the actuator 110. In particular, the ETRS park lever 600 may require a "push" on the actuator rod 118 to disengage from park and a "pull" to engage the park pawl 104 with the park gear 102. This is not possible with the actuator 110 of FIGS. 1-7. Not only is the cam surface 112 and the park land 134 oriented in the wrong axial direction on the actuator 110, but the axial arrangement of these features on the actuator 110 requires the end 136 of the actuator rod to extend a distance from the actuator guide 114, a distance which must be accommodated within the transmission housing 152 as shown in FIG. 6.

Figure 7:
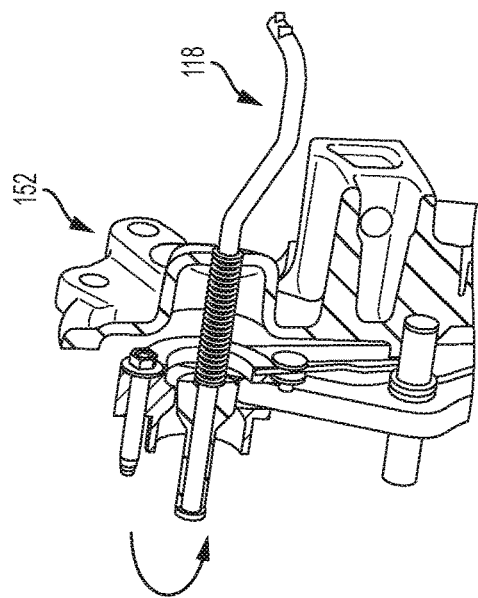
FIG. 7 is a perspective view of the park actuator of FIG. 2 with the orientation of the park actuator reversed.

Further, as illustrated by FIG. 7, it is not feasible to accommodate the actuator rod 118 within the transmission housing 152 if reversed in direction to accommodate for an ETRS system that may require "push" on the actuator rod 118 to disengage park and a "pull" to engage park.

Figure 8:
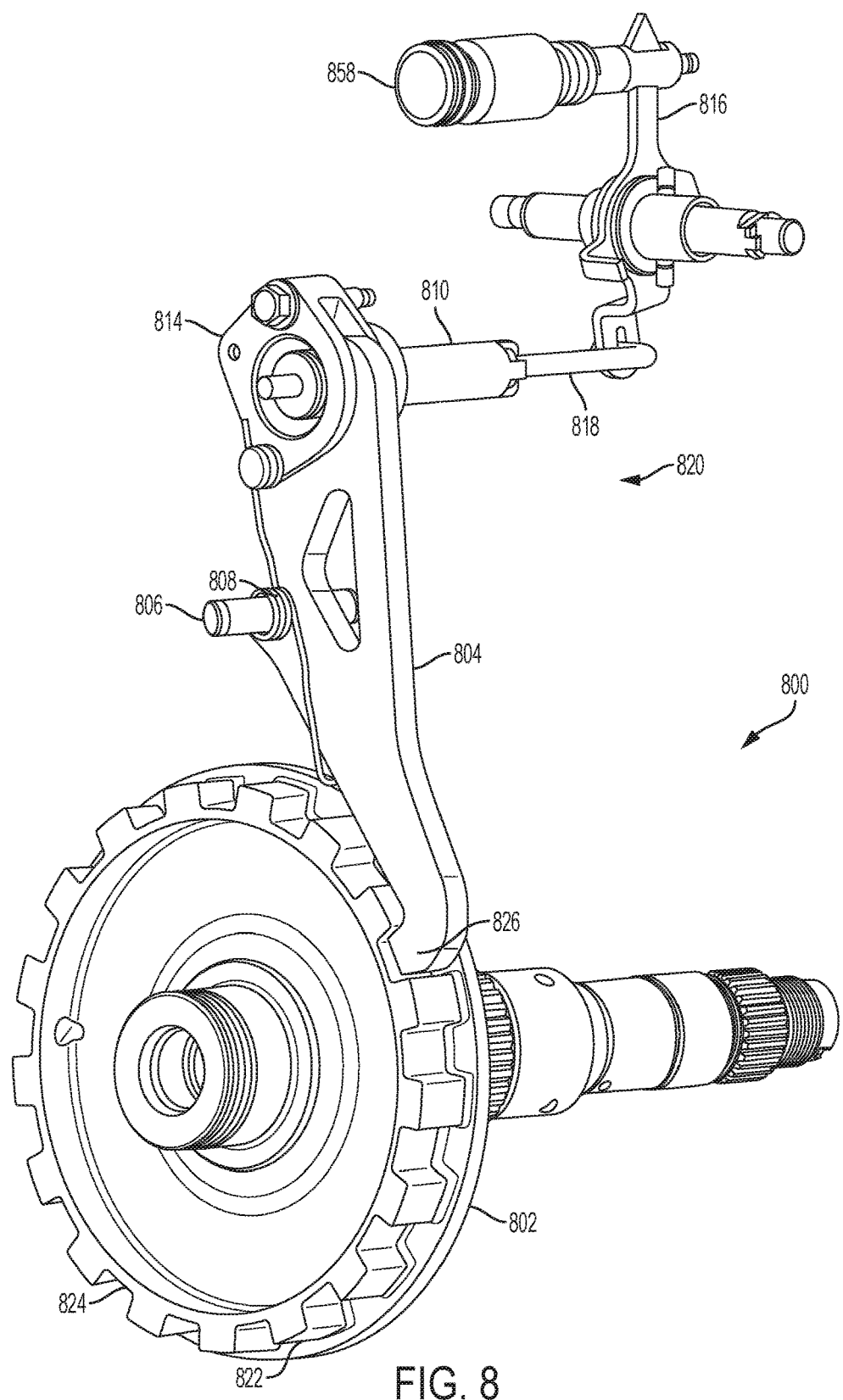
FIG. 8 is a perspective view of an exemplary park system in accordance with the present invention.

FIG. 8 illustrates a new park system 800 for a transmission (not shown). The system 800 includes a park gear 802 that is fixed with respect to an output shaft (not shown) of the transmission and a park pawl 804 rotatably mounted on pawl pin 806. A pawl return spring 808 is also mounted on the pawl pin 806 and rotatably biases the park pawl 804 away from engaging the park gear 802. An actuable park pawl system 820 is actuable with an actuator 810 with a cam portion 812 (see FIG. 13B), park pawl 804 in mechanical communication with the cam portion 812 and rotatable when in mechanical communication with the cam portion 812 to actuate the park pawl system 820. The actuator guide 814 accommodates the mechanical communication of the park pawl 804 and cam portion 812 when the park pawl system 820 is actuated. Also included is a park lever 816, which actuates the park pawl system 820, and a connecting rod 818 that sends a mechanical signal from the shift selector 816 to the park pawl system 820. The actuator guide 814 is open ended to allow the connecting rod 818 to pass through the actuator guide 814 as short distance.

FIG. 8 illustrates the interaction between the park gear 802, park pawl system 820 and the shift selector 816. The park gear 802 has a number of teeth 822 and tooth recesses 824 on its perimeter. The pawl 804 includes a pawl tooth 826 that fits into the tooth recesses 824 on the park gear 802 perimeter upon activation of the park pawl system 820 (as shown in FIGS. 13A-13C). The park pawl 804 is mounted on the pawl pin 806 and is free to rotate or pivot about the pawl pin 806. A pawl return spring 808 operates to bias the pawl 804 toward the disengaged position except when mechanically engaged. The pawl 804 is mounted adjacent to the slotted actuator guide 814 and actuator 810 so that upon transverse motion of the actuator 810 the pawl 804 is rotated or pivoted between the engaged and disengaged positions.

The connecting rod 818 is secured to the park lever 816. The park lever 816 is pivotally secured to the transmission (not shown) at 842. The park lever 816 is also secured to a park servo 858 of an ETRS system that shifts from a park position (FIGS. 9A-9C) and an out-of-park position (FIGS. 10A-10C). The park servo 858 includes a piston 860 connected to the park lever 816 that is movable to an extended position to maintain an out-of-park position and is movable to a retracted position to maintain a park position. The park servo 858 is operable to selectively move the piston 860 between the extended position and the retracted position.

The actuator guide 814 encases the actuator 810. The actuator guide 814 has an internal cavity 828 (as shown in FIG. 9B) contoured to the shape of the actuator 810. The actuator guide 814 has a slot 830 on its perimeter, adjacent the back 832 of the pawl 804, which is configured to guide and support the pivotal movement of the pawl 804. Movement of the actuator 810 to the right in FIGS. 9A-9B causes the cam portion 812 and park land 834 of the actuator 810 to collide with the back 832 of the park pawl 804 and force the park pawl 804 to rotate the pawl tooth 826 into engagement with a tooth recess 824 (as shown in FIG. 9C). Movement of the actuator 810 to the left, as shown in FIGS. 10A-10B, moves the back 832 of the pawl 804 from the park land 834, down the cam portion 812, and onto a non-park land 835 which allows the pawl 804 to be rotated by the pawl return spring 808 into a position where the pawl tooth 826 is removed from a tooth recess 824 (as illustrated by FIGS. 10A-10C).

Figure 11:
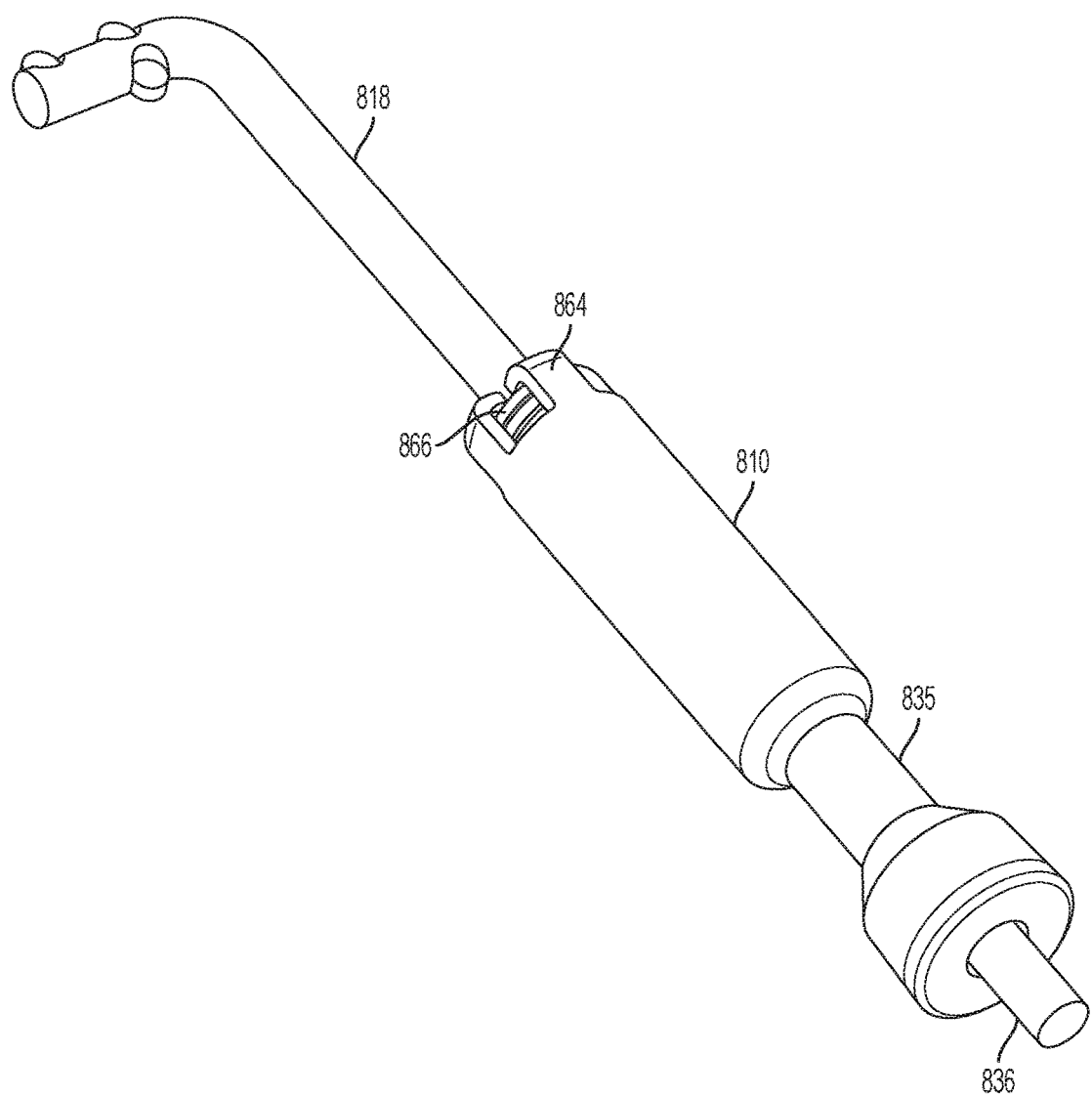
FIG. 11 is a perspective view of an exemplary park actuator for the park system of FIG. 8.
Figure 12:
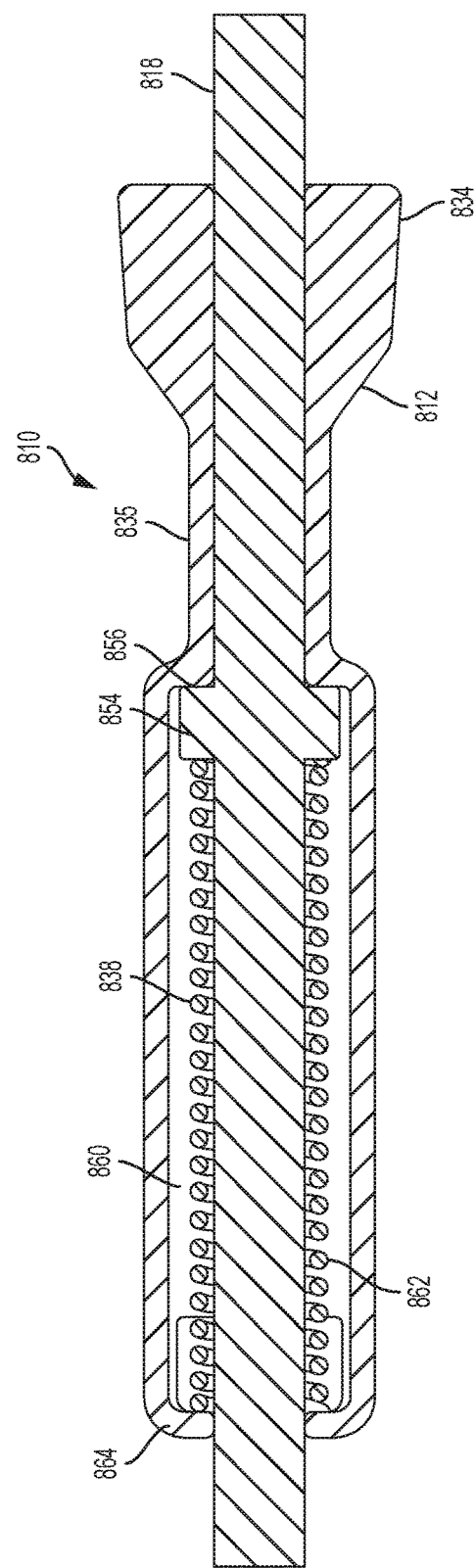
FIG. 12 is a partial cross-section of the park actuator of FIG. 11.

As is illustrated in FIGS. 11 and 12, the actuator 810 is spring mounted to an end portion 836 of the connecting rod 818. The actuator return spring 838 functions to enable shift selection of park regardless of the position of the pawl 804 relative to the park gear 802, teeth 822, and tooth recesses 824. If a park gear tooth 822 is located over or adjacent to the pawl tooth 826 when park is selected, the pawl tooth 826 will not engage in a tooth recess 824, but the end 836 of the connecting rod 818 will continue to move with respect to the actuator 810 against the bias of the actuator return spring 838, and the end 836 of the actuator rod 818 will retract into the actuator 810 a short distance (as opposed to extending further out of the actuator guide as happens with the system described above and illustrated with reference to FIGS. 1-7). The actuator return spring 838 enables selection of park by maintaining an axial force or bias on the actuator 810 until the park gear 802 rotates to a point where the gear tooth 822 is no longer adjacent to the pawl tooth 826. With the continued bias of actuator return spring 838, the pawl tooth 826 will then engage with a tooth recess 824 at the first opportunity.

As shown in FIG. 12, the actuator rod 818 includes a collar 854 that is integrally formed on the actuator rod 818 and which, being enclosed within an internal cavity 862 of the actuator 810, provides a reliable and positive engagement with which actuation of the actuator rod 818 may be pushed out of park (as shown in FIGS. 10A-10C). Unlike the very small surface engagement area between the end 116 of the actuator rod 118 and the actuator 110 as explained above and illustrated with reference to FIGS. 2 and 3, the collar 854 provides a much larger surface area against which an internal land 856 of the actuator 810 will provide positive, reliable, and secure engagement. In this manner, the risk of disengagement of the actuator 810 from the actuator rod 818 is substantially reduced in comparison to that of actuator 110 from actuator rod 118. Thereby significantly reducing the risk of the transmission from being stuck in a park mode.

The actuator return spring 838 is entirely captured or enclosed within an internal cavity 862 of the actuator 810 and biases against collar 854 of the actuator rod 818 at one end and against actuator tabs 864 at the other end. With this structure, when the actuator rod 818 is moved toward the park position (to the right as illustrated by FIGS. 9A and 9B) the actuator rod 818 moves to the left (in FIG. 12) relative to the actuator 810 such that the collar 854 compresses the actuator return spring 838 which, in turn, biases against the actuator tabs 864 which, in turn, biases the actuator 810 toward the park position (illustrated by FIG. 9B). This new structure for an actuator assembly provides for simple assembly and construction. The actuator rod 818 may be fabricated with the integral collar 854 and the actuator 810 may be fabricated with straight tabs 854 (not shown).

The actuator 810 is configured such that a metal injection molding and cold heading process may be used to form the actuator 810. In stark contrast to a screw machining process which is typically used to manufacture the actuator 110 of FIGS. 1-7, a metal injection molding process improves the dimensional surface roughness. This obviates the necessity of further processing to eliminate tool marks such as with a vibratory tumbling process as may typically be required by an actuator 110 formed by a screw machining process.

During assembly, the actuator return spring 838 may be coaxially mounted on the actuator rod 818 and the actuator rod 818 may then be axially slid into the open end of the actuator 810 while the tabs 864 are straight. The gaps 866 between the tabs 864 provide openings through which an assembly tool may engage and compress the actuator return spring 838 against the collar 854 while simultaneously bending the tabs 864 into a position whereby the actuator return spring 838 is then captured within the internal cavity 862 of the actuator 810. In this manner, the actuator assembly may be easily assembled.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A parking actuator assembly for an automatic transmission comprising:
   an actuator rod;
   an actuator axially slidable on the actuator rod; and
   a spring enclosed within the actuator on the actuator rod, wherein the spring is positioned toward a proximal end of the actuator, and wherein the actuator further comprises a park land positioned at a distal end of the actuator, and a non-park land positioned between the spring and the park land, wherein the actuator includes tabs at one end of the actuator biasing against one end of the spring.

2. The assembly of claim 1, wherein the actuator rod comprises an integral collar positioned within the internal cavity of the actuator.

3. The assembly of claim 1, wherein the spring is within an internal cavity of the actuator.

4. The assembly of claim 1, wherein the tabs are separated by gaps.

5. The assembly of claim 1, wherein the actuator is formed by metal injection molding.

6. A transmission park system comprising:
   a park gear;
   a park pawl pivotally mounted for selective engagement with the park gear;
   an actuator guide with a slot that receives a surface of the park pawl;
   an actuator assembly comprising:
      an actuator rod;
      an actuator axially slidable within the actuator guide on the actuator rod and in contact with the surface of the park pawl; and
      a spring enclosed within the actuator on the actuator rod, wherein the spring is positioned toward a proximal end of the actuator, and wherein the actuator further comprises a park land positioned at a distal end of the actuator, and a non-park land positioned between the spring and the park land; and
   a shift selector connected to the actuator rod, wherein the actuator includes tabs at one end of the actuator biasing against one end of the spring.

7. The system of claim 6, wherein the actuator rod comprises an integral collar positioned within an internal cavity of the actuator.

8. The system of claim 6, wherein the spring is within an internal cavity of the actuator.

9. The system of claim 6, wherein the tabs are separated by gaps.

10. The system of claim 6, wherein the actuator further comprises a cam surface positioned between the park land and the non-park land.

11. The system of claim 10, wherein the actuator encloses the spring within an internal cavity and includes tabs at one end of the actuator biasing against one end of the spring.

12. The system of claim 11, wherein the actuator rod comprises a collar positioned within the internal cavity and biasing against the other end of the spring.

13. The system of claim 12, wherein the spring is compressed between the collar and the tabs when the shift selector pulls on the actuator rod as the surface of the park pawl axially slides between the non-park land, across the cam surface, and onto the park land.

14. The system of claim 11, wherein the actuator rod comprises a collar enclosed within an internal cavity of the actuator.

15. The system of claim 14, wherein the actuator includes an internal land that axially abuts the collar when the shift selector pushes on the actuator rod to move the actuator within the actuator guide such that contact between the actuator and the surface of the park pawl moves from the park land, across the cam surface and onto the non-park land.

16. The system of claim 6, wherein the actuator is formed by metal injection molding.

* * * * *